United States Patent
Baty et al.

(10) Patent No.: US 9,440,525 B1
(45) Date of Patent: Sep. 13, 2016

(54) SOLAR POWERED ASSISTED TRAILER COOLING SYSTEM

(76) Inventors: Kathleen K. Baty, Trent, SD (US); Larry L. Baty, Trent, SD (US)

(*) Notice: Subject to any disclaimer, the term of this patent is extended or adjusted under 35 U.S.C. 154(b) by 189 days.

(21) Appl. No.: 13/050,535

(22) Filed: Mar. 17, 2011

(51) Int. Cl.
| | |
|---|---|
| B60K 6/28 | (2007.10) |
| B60K 1/04 | (2006.01) |
| B60K 6/48 | (2007.10) |
| H02J 7/20 | (2006.01) |
| B60H 1/00 | (2006.01) |
| B60K 1/00 | (2006.01) |

(52) U.S. Cl.
CPC ............. *B60K 6/28* (2013.01); *B60H 1/00428* (2013.01); *B60K 1/00* (2013.01); *Y02T 10/6213* (2013.01); *Y02T 10/6221* (2013.01)

(58) Field of Classification Search
CPC .......... H02J 7/1461; H02J 7/35; H02J 7/355; H02J 7/20; H02J 7/1423; Y02B 10/70; Y02B 10/20; Y02T 10/7005; Y02T 10/92; Y02T 10/6221; G01R 31/3679; G01R 19/16542; G01R 31/3648; Y02E 60/12; B60R 16/03; B60R 6/28; B60R 6/48
USPC ......... 62/235.1, 3.61, 244; 165/42, 43, 48.2, 165/902; 180/65.31, 65.22, 65.8
See application file for complete search history.

(56) References Cited

U.S. PATENT DOCUMENTS

| | | | |
|---|---|---|---|
| 4,181,188 A * | 1/1980 | Dessert .................... | B60K 1/00 136/291 |
| 4,261,329 A * | 4/1981 | Walsh et al. ................. | 126/569 |
| 4,633,767 A | 1/1987 | Sain | |
| 4,911,257 A * | 3/1990 | Kajimoto ........... | B60H 1/00978 136/291 |
| 4,982,971 A | 1/1991 | Marin | |
| 5,683,060 A | 11/1997 | Iturralde | |
| 5,725,062 A * | 3/1998 | Fronek ..................... | B60L 8/00 180/165 |
| 6,371,409 B1 | 4/2002 | Steele | |
| 6,380,481 B1 * | 4/2002 | Muller .................... | B60L 8/003 123/2 |
| 6,396,169 B1 * | 5/2002 | Voegeli ..................... | G06F 1/26 307/33 |
| 6,626,003 B1 * | 9/2003 | Kortum et al. .............. | 62/235.1 |
| 6,662,572 B1 | 12/2003 | Howard | |
| 7,338,335 B1 * | 3/2008 | Messano ................ | B60G 13/14 180/65.22 |
| 7,828,099 B2 * | 11/2010 | Heckeroth ............... | B60K 1/00 180/2.2 |
| 8,141,666 B2 * | 3/2012 | Ganiere .................. | B60L 1/003 180/2.2 |
| 8,295,950 B1 * | 10/2012 | Wordsworth ...... | B60H 1/00428 307/86 |
| 8,347,999 B2 * | 1/2013 | Koelsch ................. | B60K 25/08 180/165 |
| 2008/0078195 A1 * | 4/2008 | Lin .................... | B60H 1/00428 62/235.1 |
| 2008/0088462 A1 * | 4/2008 | Breed ........................ | 340/573.1 |
| 2008/0100258 A1 * | 5/2008 | Ward .................. | H01M 10/465 320/101 |
| 2009/0019748 A1 | 1/2009 | Rosarius | |
| 2009/0234740 A1 | 9/2009 | Jabbari | |
| 2009/0289486 A1 * | 11/2009 | Jimenez Pino ...... | B60N 2/0244 297/344.1 |
| 2012/0159979 A1 * | 6/2012 | Debesa ........................ | 62/235.1 |
| 2013/0000342 A1 * | 1/2013 | Blasko et al. ............... | 62/235.1 |

\* cited by examiner

*Primary Examiner* — Frantz Jules
*Assistant Examiner* — Meraj A Shaikh

(57) ABSTRACT

A solar powered assisted trailer cooling system includes a trailer that has a bottom wall, a top wall and a perimeter wall attached to and extending between the top and bottom walls. The trailer is configured to be pulled by a vehicle to define a tractor trailer. A cooling assembly is mounted on the perimeter wall and is configured to cool an interior of the trailer. The cooling assembly includes a compressor powered by an electric motor. A plurality of solar panels converts sunlight into electricity. Each of the solar panels is mounted on an upper surface of the top wall. The plurality of solar panels is electrically coupled to a plurality of batteries. The solar panels recharge the batteries when the solar panels are producing electricity. The batteries are electrically coupled to the electric motor to power the compressor.

4 Claims, 3 Drawing Sheets

SOLAR POWERED ASSISTED TRAILER COOLING SYSTEM

BACKGROUND OF THE DISCLOSURE

Field of the Disclosure

The disclosure relates to solar powered cooling devices and more particularly pertains to a new solar powered cooling device for cooling a trailer in an energy efficient manner.

SUMMARY OF THE DISCLOSURE

An embodiment of the disclosure meets the needs presented above by generally comprising a trailer that has a bottom wall, a top wall and a perimeter wall attached to and extending between the top and bottom walls. The trailer is configured to be pulled by a vehicle to define a tractor trailer. A cooling assembly is mounted on the perimeter wall and is configured to cool an interior of the trailer. The cooling assembly includes a compressor powered by an electric motor. A plurality of solar panels converts sunlight into electricity. Each of the solar panels is mounted on an upper surface of the top wall. The plurality of solar panels is electrically coupled to a plurality of batteries. The solar panels recharge the batteries when the solar panels are producing electricity. The batteries are electrically coupled to the electric motor to power the compressor.

Another embodiment of the disclosure meets the needs presented above by generally comprising a trailer that has a bottom wall, a top wall and a perimeter wall that is attached to and extends between the top and bottom walls. The trailer is configured to be pulled by a vehicle to define a tractor trailer. A cooling assembly is mounted on the perimeter wall and is configured to cool an interior of the trailer. The cooling assembly includes a compressor is powered by an electric motor. A plurality of solar panels is provided. Each of the solar panels is configured to convert sunlight into electricity and each is mounted on an upper surface of the top wall. A plurality of batteries is provided. The plurality of solar panels is electrically coupled to the batteries. The solar panels recharge the batteries when the solar panels are producing electricity. The batteries is electrically coupled to the electric motor to power the compressor. A motor is in mechanical communication with a generator. The generator produces electricity when the motor actuates the generator. The generator is electrically coupled to the batteries to recharge the batteries when the batteries have been discharged to a predetermined level. The motor is fueled by a liquid fuel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
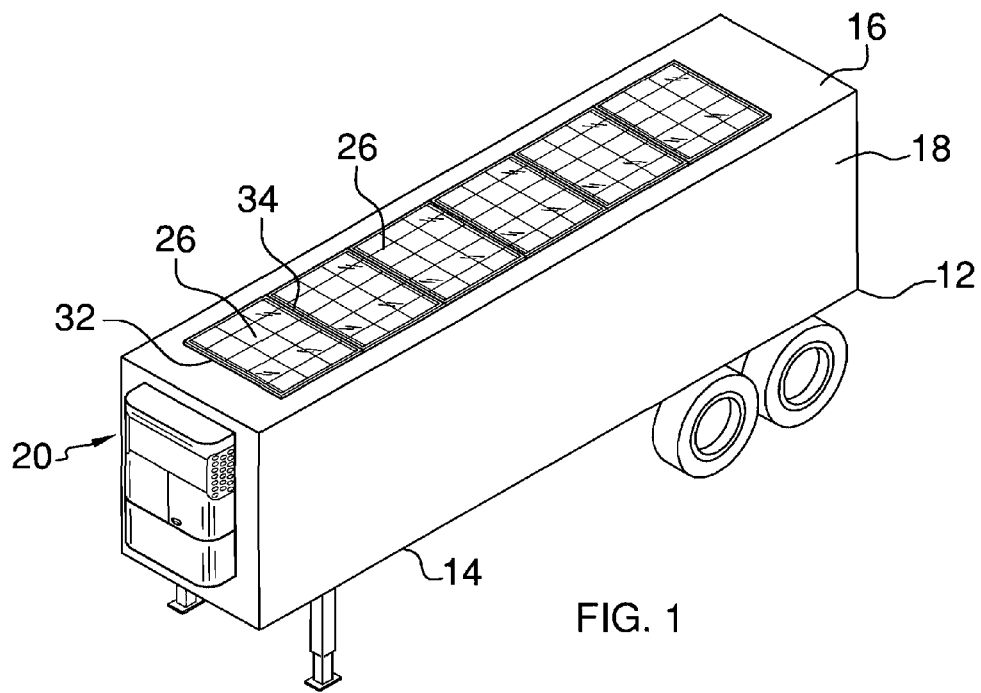
FIG. 1 is a top perspective view of a solar powered assisted trailer cooling system according to an embodiment of the disclosure.
Figure 2:
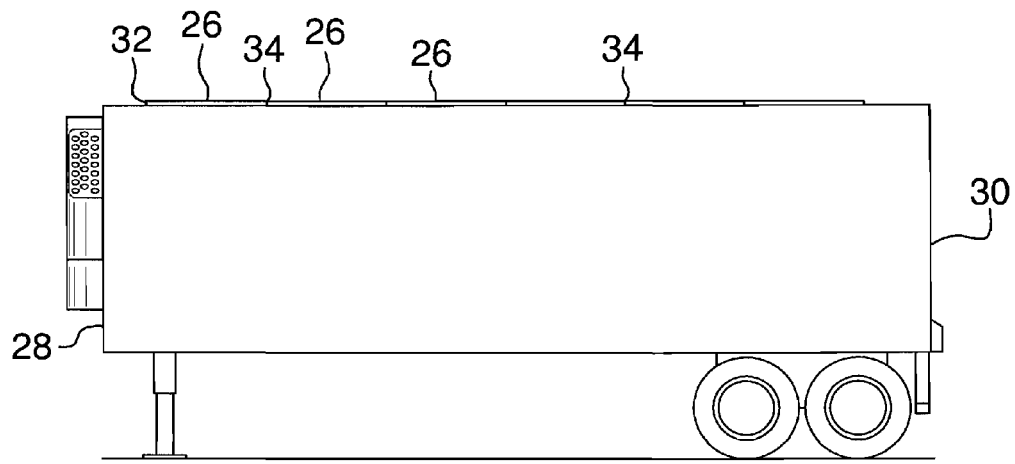
FIG. 2 is a side view of an embodiment of the disclosure.
Figure 3:
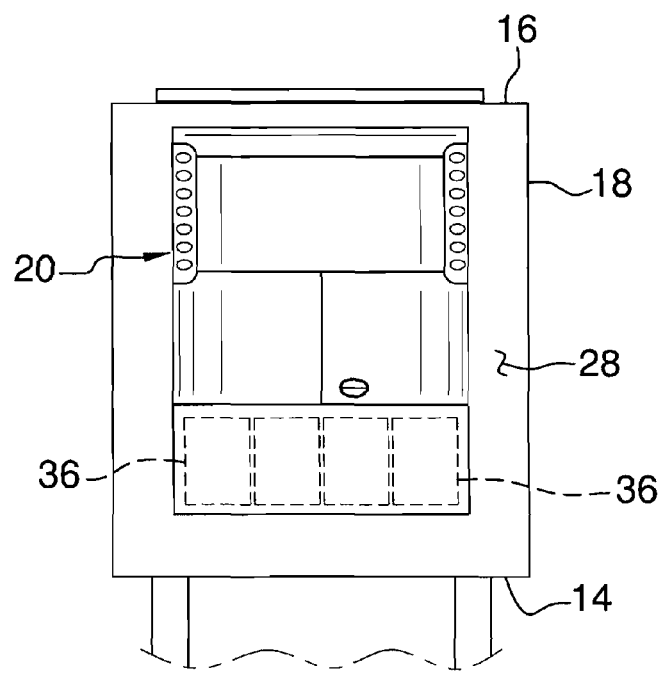
FIG. 3 is a front view of an embodiment of the disclosure.
Figure 4:
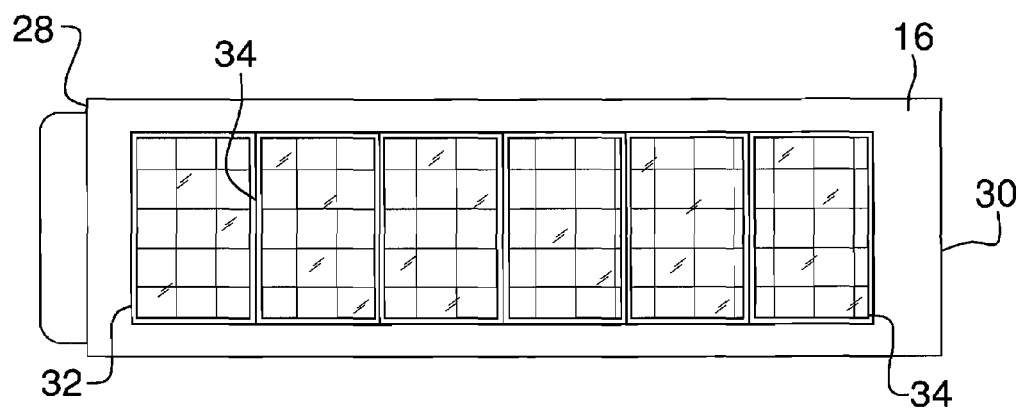
FIG. 4 is a top view of an embodiment of the disclosure.
Figure 5:
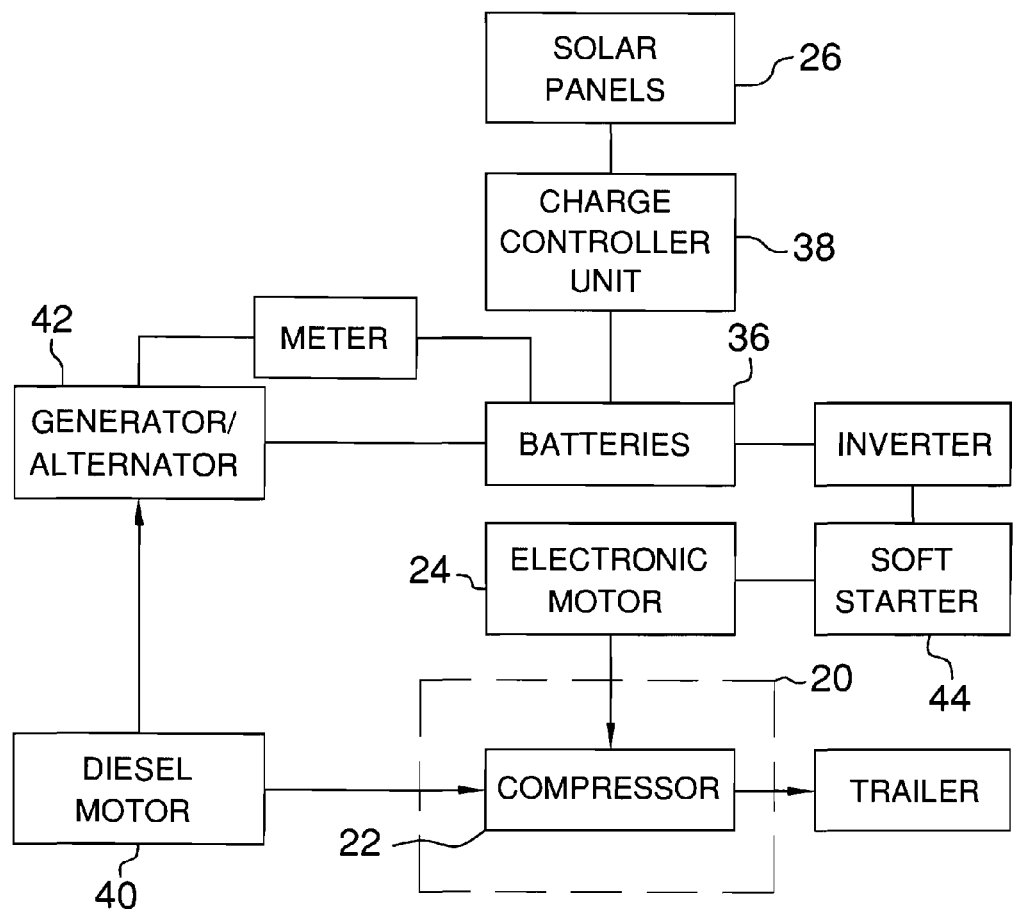
FIG. 5 is a schematic view of an embodiment of the disclosure.

With reference now to the drawings, and in particular to FIGS. 1 through 5 thereof, a new solar powered cooling device embodying the principles and concepts of an embodiment of the disclosure and generally designated by the reference numeral 10 will be described.

As best illustrated in FIGS. 1 through 5, the solar powered assisted trailer cooling system 10 generally comprises a trailer 12 that has a bottom wall 14, a top wall 16 and a perimeter wall 18 that is attached to and extends between the top 16 and bottom 18 walls. The trailer 12 is generally conventional and is configured to be pulled by a vehicle, not shown, to define a tractor trailer.

A cooling assembly 20 conventional to and used for cooling trailers is mounted on the trailer 12, such as on the perimeter wall 18, and is configured to cool an interior of the trailer 12. The cooling assembly 20 includes a compressor 22 that may be powered by an electric motor 24. The cooling assembly 20 would likely also include a condenser, temperature sensing means, one or more fans, coolant conduits and air conduits for air transfer.

A plurality of solar panels 26 is provided. Each of the solar panels 26 is configured to convert sunlight into electricity. The term "panel" is being used here to designate one integral panel which may include many solar cells or multiple panels attached together. More particularly, the solar panels 26 are preferably those known in the art as solar film which are photovoltaic cells that are lightweight, thin and partially flexible. Each of the solar panels 26 is mounted on an upper surface of the top wall 16. The perimeter wall 18 includes a front wall 28 and a rear wall 30, wherein a vehicle would be coupled to the trailer under the front wall 28. The solar panels each have a forward edge 32 and a rear edge 34 wherein the forward edges 32 of each of the solar panels 26 are positioned nearer to the front wall 28 than the rear wall 30. The solar panels 26 may be glued directly to the top wall 16. While FIG. 1 shows six solar panels 26, it should be understood that different numbers may be used as well as different sizes as the object is to cover a substantial portion of the top wall 16 and in particular it may be beneficial to cover more than 80% of an area of the top wall 16.

A plurality of batteries 36 is provided and mounted to the trailer 12. The batteries 36 may be positioned on the front wall 28 under the cooling assembly 20. Each of the solar panels 26 is electrically coupled to the batteries 36. The solar panels 26 recharge the batteries 36 when the solar panels 26 are producing electricity. The batteries 36 are electrically coupled to the electric motor 24 to power the compressor 22. A charge controller unit 38 is in electrical communication with the solar panels 26 and the batteries 36. The charge controller unit 38 inhibits overcharging of the batteries 36 by the solar panels 26. The batteries 36 may be stored in one or multiple locations on the trailer 12, and may also be mounted beneath the trailer 12.

A motor 40 is in mechanical communication with a generator 42 or alternator. The generator 42 produces electricity when the motor 40 actuates the generator 42. The generator 42 is electrically coupled to the batteries 36 to recharge the batteries 36 when the batteries 36 have been discharged to a predetermined level, such as, for instance, less than 20% of full capacity. The voltage reading of the batteries 36 may be accomplished with a volt meter or with the charge controlling unit 38. The motor 40 is fueled by a liquid fuel and may typically include a diesel motor. It should be understood that the motor 40 may also be used to directly power the compressor 22 when the batteries 36 have been discharged to the predetermined level.

It has been found that an electric motor 24 of the type used with the system 10 will benefit from a soft starter 44 required to increase voltage until the electric motor 24 attains its required speed. While any conventional soft starter 44 may be used, one which has been found effective is the PowerFlex 70 sold by Rockwell Automotive, 1201 South Second Street, Milwaukee, Wis., 53204. The soft starter 44 will provide the required voltage needed to start the electric motor 24 while providing minimal drain on the batteries 36.

In use, the trailer 12 is cooled in a conventional manner by the cooling assembly 20. However, the cooling assembly 20 will be powered by batteries 36, as opposed to being powered directly by a motor. The solar panels 26 will charge the batteries 36 so that they can be used instead of utilizing liquid fuel to power the generator 42 or directly power the cooling assembly 20. When the batteries 36 become drained, the motor 40 will run the generator 42 to recharge the batteries and may also be used to directly power the compressor 22. The above system allows for great efficiencies with respect to fuel consumption when cooling the trailer 12 while ensuring that the compressor 22 specifically, and the cooling assembly 20 in general, has a constant source of power.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A solar powered cooling system comprising:
a trailer having a bottom wall, a top wall and a perimeter wall being attached to and extending between said top and bottom walls, said trailer being configured to be pulled by a vehicle to define a tractor trailer, a plurality of wheels being attached to said trailer and extending downwardly from said bottom wall, said top wall being horizontally oriented;
a cooling assembly being mounted on said perimeter wall and being configured to cool an interior of said trailer, said cooling assembly including a compressor coupled to an electric motor such that said electric motor can drive said compressor; a power system for supplying power to said electric motor, said power system consisting of:
a plurality of batteries mounted on said trailer, said batteries being electrically coupled to said electric motor to provide power to said electric motor to drive said compressor; a soft starter being electrically coupled to said plurality of batteries and said electric motor to increase voltage until said electric motor attains an operational speed;
a first source of power, said first source of power comprising a solar power system electrically coupled to said batteries and configured to charge said batteries such that said batteries can provide power to said electric motor to drive said compressor, a charge controller being in electrical communication with said batteries and said solar power system to inhibit overcharging of said batteries by said solar power system;
a second source of power in communication with said batteries to charge said batteries when said batteries have been discharged to a predetermined level, said second source of power comprising:
a diesel motor coupled to a generator electrically coupled to said batteries and configured to charge said batteries to provide power to said electric motor to drive said compressor; or
a diesel motor directly coupled to said compressor and configured to drive said compressor.

2. The solar powered cooling system according to claim 1, further including an inverter being electrically coupled to said plurality of batteries and said soft starter.

3. The solar powered cooling system according to claim 1, wherein said solar power system comprises a plurality of solar panels, each solar panel being configured to convert sunlight into electricity, and each solar panel being mounted on an upper surface of said top wall.

4. The solar powered cooling system according to claim 3, wherein each solar panel has a forward edge and a rear edge, each forward edge being positioned nearer to a front wall of said trailer than a rear wall of said trailer.

\* \* \* \* \*